United States Patent
Scrimpshire et al.

(10) Patent No.: US 6,429,373 B1
(45) Date of Patent: *Aug. 6, 2002

(54) MULTIPURPOSE FLEXIBLE CABLE BOOT FOR ENCLOSING TRUNK AND FEEDER CABLE CONNECTORS

(76) Inventors: James M. Scrimpshire, 3229 Rosemary Ave., Jackson, MS (US) 39212; Rudolph D. Sullivan, 475 Pineview La., Brandon, MS (US) 39042

(*) Notice: Subject to any disclaimer, the term of this patent is extended or adjusted under 35 U.S.C. 154(b) by 0 days.

This patent is subject to a terminal disclaimer.

(21) Appl. No.: 09/697,407

(22) Filed: Nov. 1, 2000

Related U.S. Application Data

(60) Provisional application No. 60/179,688, filed on Feb. 20, 2000.

(51) Int. Cl.[7] ............................................. H02G 15/02
(52) U.S. Cl. .................. 174/74 R; 174/74 A; 174/75 C
(58) Field of Search ............... 174/35 R, 35 C, 174/36, 84 R, 75 C, 93, 74 R, 77 R, 82, 74 A

(56) References Cited

U.S. PATENT DOCUMENTS

| | | | | |
|---|---|---|---|---|
| 3,836,701 A | * | 9/1974 | Worden | 174/93 |
| 4,015,072 A | * | 3/1977 | Gillemot | 174/92 |
| 4,079,193 A | * | 3/1978 | Channell | 17/138 F |
| 4,173,385 A | * | 11/1979 | Fenn et al. | 339/177 E |
| 5,132,495 A | * | 7/1992 | Ewing et al. | 174/138 |
| 5,198,619 A | * | 3/1993 | Baker | 174/74 A |
| 5,886,294 A | * | 3/1999 | Scrimpshire et al. | 174/35 R |

* cited by examiner

Primary Examiner—Chau N. Nguyen
Assistant Examiner—William H. Mayo, III
(74) Attorney, Agent, or Firm—Garvey, Smith, Nehrbass & Doody, LLC; Gregory C. Smith

(57) ABSTRACT

A one-piece flexible cable boot for external installation around a cable connector of the type being coaxial in nature. The cable would include a flexible, closely fit external sleeve having a compressive end for supporting a cable against flexing (strain relief) and having on its second end an inwardly extending seal, deformable so that it can be pushed, screwed or twisted onto, the threads or housing of the device to form a water tight seal. The connector would also include EPDM material which is known in the art which is ozone and chemical resistant. The assembly is specifically designed for enclosing trunk and feeder cable connectors that are mounted in taps, amplifiers, nodes, line extenders, and directional couplers for aerial and underground applications. It will also be used for splicing cables that have been cut or extended. The apparatus would also allow reentry into the connector for maintenance and quality inspection, and would comprise a plurality of transverse and longitudinal ribs on the exterior of the body for gripping the assembly tightly and for providing strain relief to the assembly.

7 Claims, 5 Drawing Sheets

MULTIPURPOSE FLEXIBLE CABLE BOOT FOR ENCLOSING TRUNK AND FEEDER CABLE CONNECTORS

CROSS-REFERENCE TO RELATED APPLICATIONS

Priority of U.S. Provisional Patent Application Serial No. 60/179,688, filed Feb. 20, 2000, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to protecting or supporting cable or a cable connection between a coaxial cable and trunk and feeder cable connectors, so that the connection is remained water tight and is resistant against ozone and chemical corrosion.

2. General Background of the Invention

In the field of telecommunication, various types of cable such as coaxial cable are engaged into a connector such as a feeder cable connector or the like, so that the connector may transfer the signals to other points in the system. As may be well appreciated, the most vulnerable point in the system is the point at which the various cables are connected into the connector, since it is at that point that the connection may become vulnerable to water or other type of external corrosive elements such as ozone or types of chemicals or even UV rays. Therefore, there is a constant effort in the industry to protect these types of connections yet at the same time make the connection quite accessible to replacement or repair, should the case arise. The present inventors have obtained several patents in protecting an external installation around a cable connector for coaxial triaxial copper twisted pair or fiber optic type cable. The first is U.S. Pat. No. 5,631,443 entitled "Interference Suppressing Cable Boot Assembly" which taught the use of an assembly for preventing electromagnetic interference in cable connections using a one-piece assembly body having end portions with each of the end portions opened for accommodating a first cable connecting to a connector and forming a seal between the assembly body and the first cable and the connector. Contained within the cavity of the assembly body was a metal based lining so as to prevent ingress and egress of radiation from the connection between the first cable and the connector. The second patent, which was a continuation in part of the first is U.S. Pat. No. 5,886,294 by the same title. In the particular assembly, there was also included on each end portion of the one-piece assembly flexible sealing rings formed on the interior surface of each of the openings for engaging around the cable and the connector and for defining a seal between the assembly body and the first cable and the connector. Again, there was included the metal base lining on the interior face of the wall body within the cavity for preventing ingress and egress of radiation. Where there is a need in the industry at this point is a one-piece assembly which may be slidably engaged around a cable connector of the type being coaxial in nature which would have a flexible closely fit external sleeve having a compressive end for supporting a cable against flexing and having on its second end an inwardly extending seal deformable so that it can be screwed or twisted onto the threads or housing of the device to form a water tight seal.

In the field of a particular type of connection of the type that would be used on taps, amplifiers, nodes line extenders, and directional couplers for aerial and underground applications, there are two types known in the art. The first is the type of weather proofing which requires heat shrinking to protect the product such as the known process of heat shrinking does. Therefore, when the product is set in place, it is heat shrinked between the connector and at the connection point, and therefore in order to be removed must be cut away from the cable. The second type is known as an air shrink connector, which is similar to the heat shrinking process described above. In this second type, a material is shrunk around the connection point and again, like heat shrinking, must be cut away in order to have access to the connection for service or repair.

BRIEF SUMMARY OF THE INVENTION

The apparatus of the present invention solves the problems in the art in a simple and straight forward manner. What is provided is a one-piece flexible cable boot for external installation around a cable connector of the type being coaxial in nature. The boot or assembly would include a flexible, closely fit external sleeve having a compressive end for supporting a cable against flexing (strain relief) and having on its second end an inwardly extending seal, deformable so that it can be screwed or twisted onto the threads or housing of the device to form a water tight seal. The boot or assembly would comprise EPDM material which is known in the art which is ozone and chemical resistant. The assembly is specifically designed for enclosing trunk and feeder cable connectors that are mounted in taps, amplifiers, nodes, line extenders, and directional couplers for aerial and underground applications. It will also be used for splicing cables that have been cut or extended. The apparatus would also allow reentry into the connector for maintenance and quality.inspection.

Therefore, it is an object of the present invention to provide a one-piece boot or assembly which is engagable onto a connection between a cable and a connection box which can be re-enterable by sliding the one-piece body assembly onto and off of the connection yet maintaining a water tight seal;

It is a further object of the present invention to provide a one-piece assembly which requires no heat or flame for installation which may cause damage to the cable and the connector;

It is a further object of the present invention to provide a one-piece assembly which is engagable onto a connection between a cable and a connection box and includes a plurality of raised transverse and longitudinal ribs for allowing the strain relief and gripping to occur as the assembly is placed onto the connection point;

It is a further object of the present invention to provide an assembly that has the following attributes: (a) no harsh chemicals required for installation such as air shrinking; (b) no special packaging required because of harsh chemicals; (c) specifically designed for enclosing trunk and feeder applications of hard line coaxial cable, fiber optics, triaxial (connectors and splices) interfaces; (d) no tools needed for quicker installation or removal; (e) water resistant, compressive sealing on cable and connector ends; (f) strain relief; (g) specifically designed for various connector sizes, cable sizes, and various devices such as amps, taps, line extenders and nodes; (h) may be assembled with or without metallic shielding; (i) ozone and UV resistant; (j) external grips for easy installation; (k) constructed of flexible EPDM rubber; (l) internal gripping design for connector tightness since loose connectors cause ingress and egress at the interface; (m) external marking or colors for proper identification; (n) aerial or underground application; (o) can be cut and sealed over existing connectors; (p) does not have to be cut off to re-enter the connection point; and (q) is a custom molded part not extruded.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
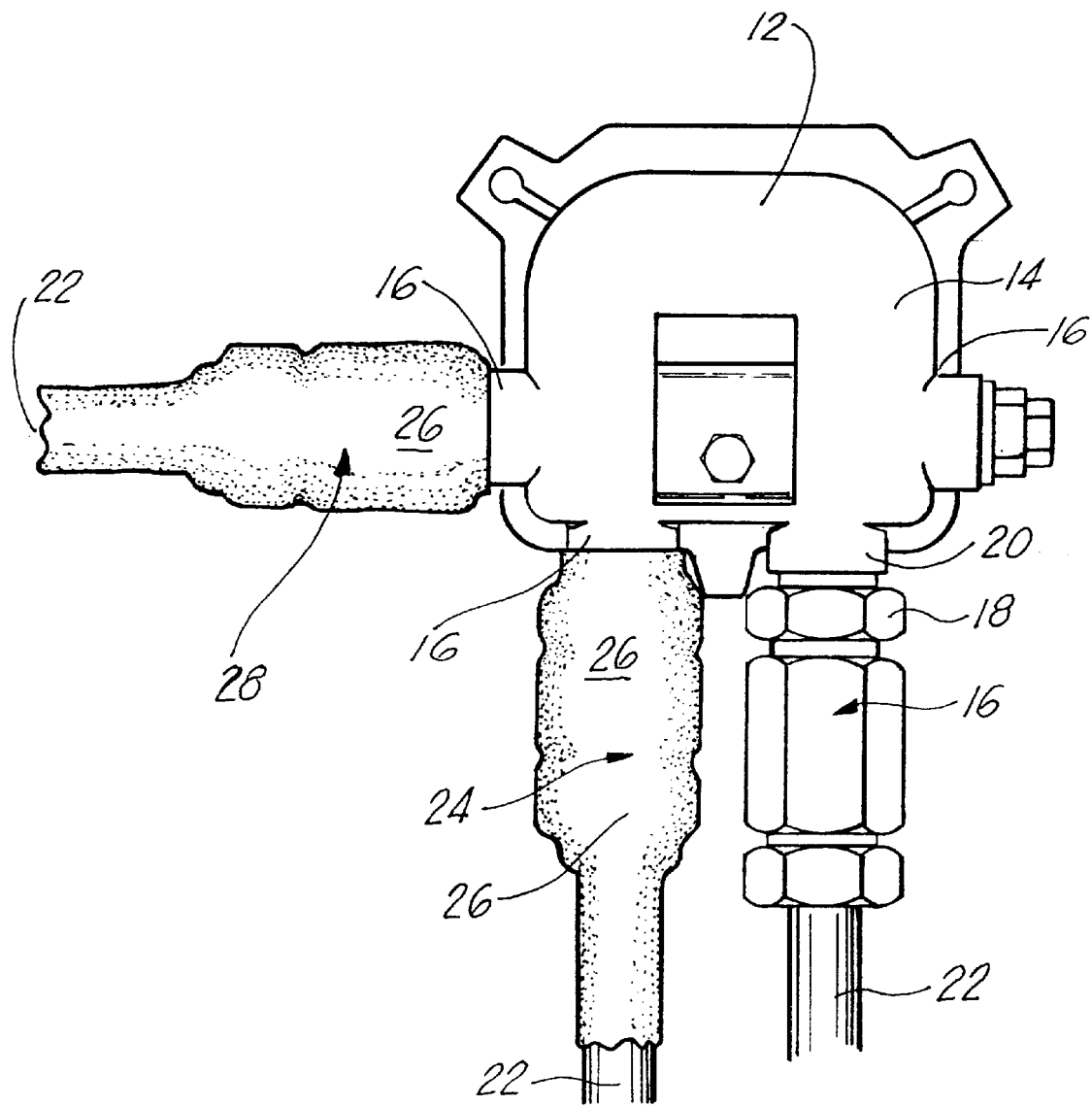
FIG. 1 illustrates the prior art involved in the present invention with the use of air shrink or heat shrink boot onto a connection system.

FIG. 1 illustrates a connector system of the type used with the present invention, but is illustrating the current type of boot known in the art as "heat shrink" or "air shrink" protection system. As seen in FIG. 1, there is illustrated a connector member 12 which is the type that could be used for hard line coaxial cable, fiber optics, triaxial interfaces. As seen there is the connector body 14 having a plurality of connection points 16 through which connectors are fed into or out of the connector 12 for transmitting signals there-through. As seen for example there is shown a connector having a connection nut 18 which is threadably engaged to a point 20 on the connection with a cable 22 leading therefrom or thereto into the connector body 12. This is illustrated as having no protection at all. As seen in connection point no. 24 there is illustrated a body member 26 engaged around the cable 22 and connection nuts 18 which is they type which could be called heat shrink which means that a material 26 made of rubber or the like is engaged around the cable and the connection nuts 18 and heat is applied to form a heat shrink connection around the cable and the connection point to avoid the ingress of water or the like. The shortcoming, of course, is that in order to have access back to open connector as seen in 16, one has to cut away the material 26. Likewise, there is seen a third connection point 28 which is again a material 26 which has been placed over the cable 22 at the connection point 16. Rather than heat shrink, this type of connection could be termed what is called air shrink which is similar to heat shrink but again forms a non-enterable or re-enterable seal around the cable and the connection point 16 and again the material 26 would have to be cut away in order to have access.

Figure 2A:
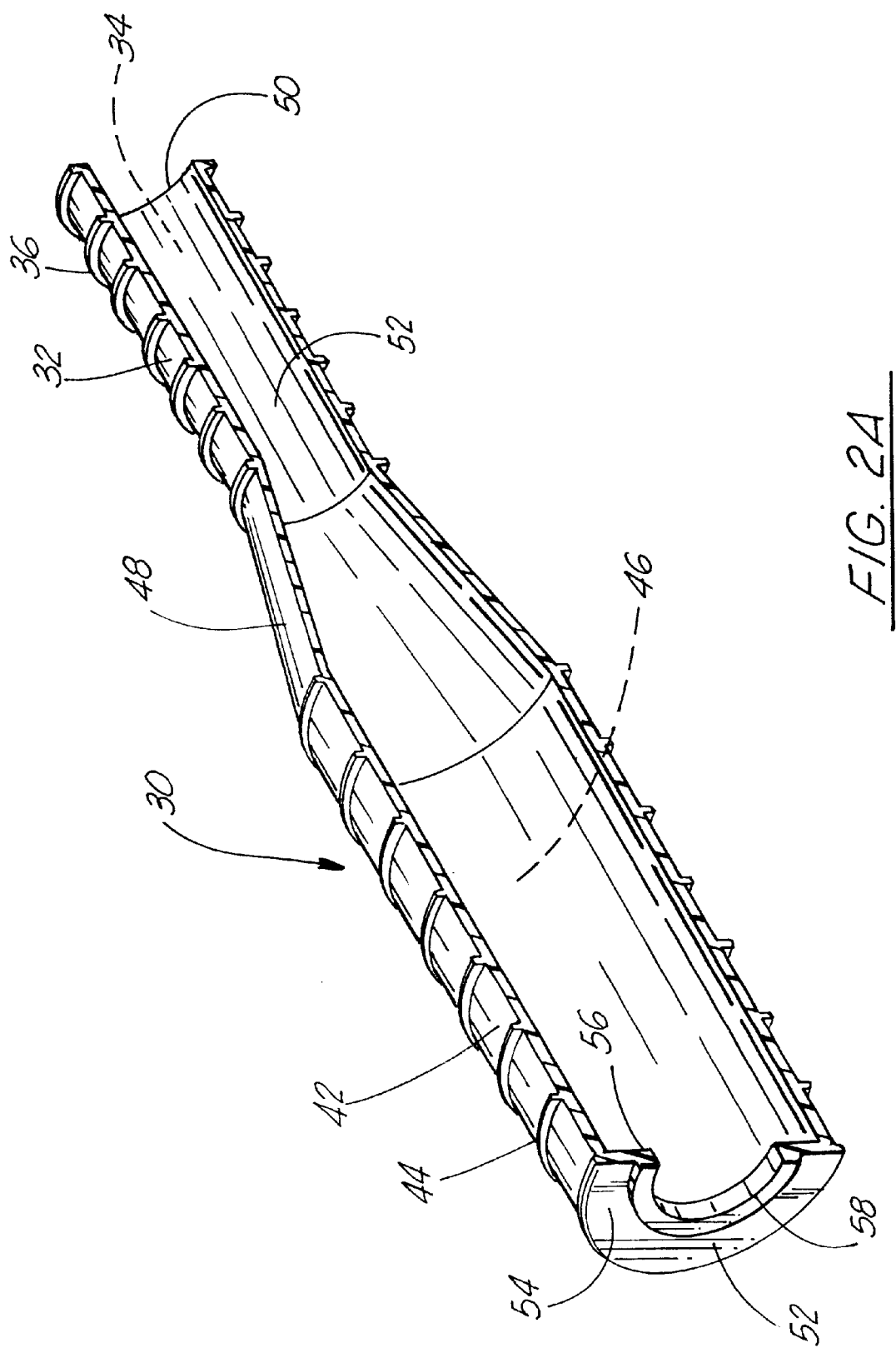
FIG. 2A illustrates a cross section of the first embodiment of the apparatus of the present invention without the use of an internal metal shield.
Figure 2B:
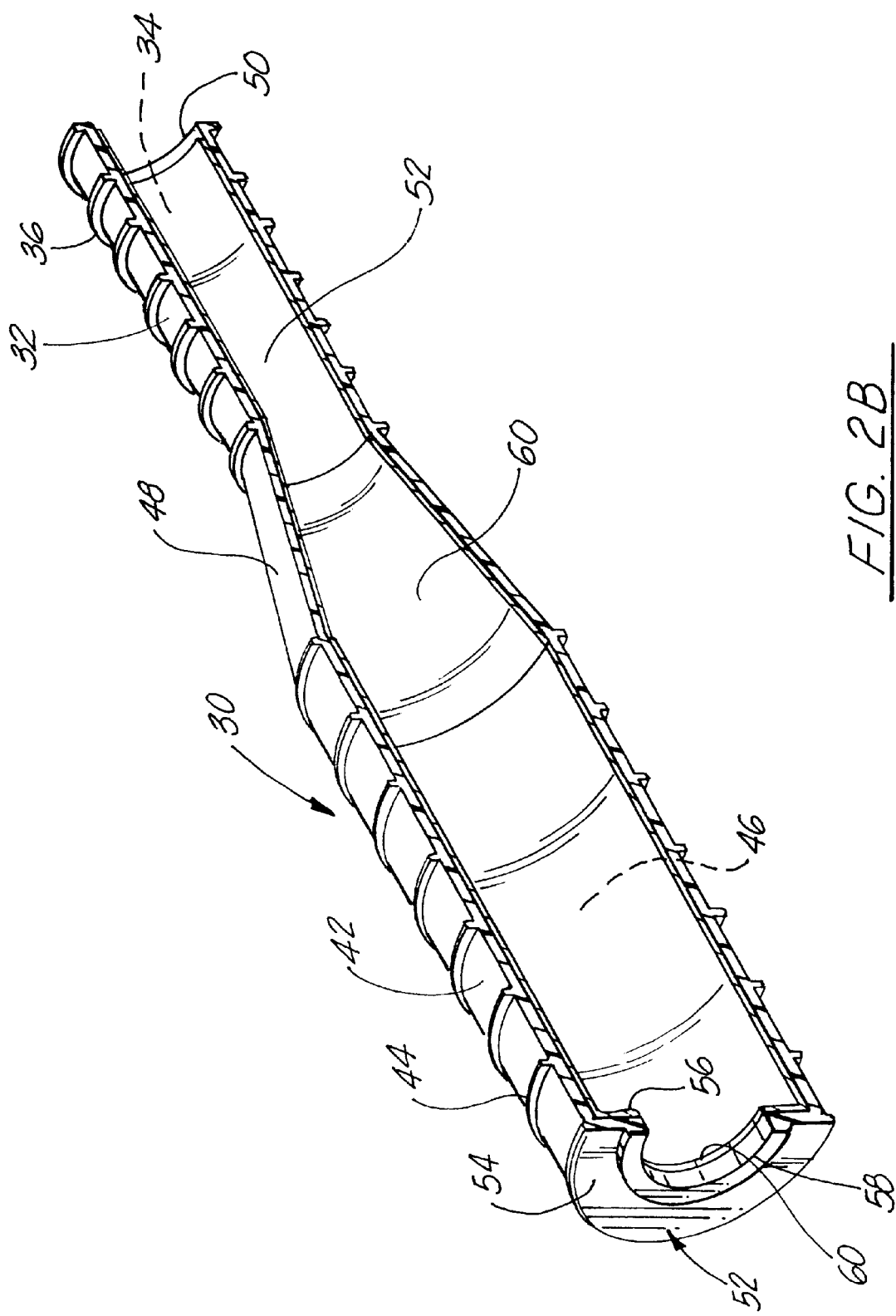
FIG. 2B illustrates the preferred embodiment of the apparatus of the present invention with a metal shield lining on the interior surface of the assembly body.

First, reference is made to FIG. 3, where the present invention is illustrated secured to the connector body 12, in a fashion that will be described later. First, however, there is illustrated the apparatus of the present invention 30 which is seen in cross-section view in FIGS. 2A and 2B. These will be discussed first to obtain an overall understanding of the apparatus 30. As seen first in FIG. 2A, there is seen in cross section view the connection body 30 of the type which is engaged around the cable and the connections as seen in FIG. 3. As illustrated connection body 30 includes a slim neck portion 32 which fits snugly around the cable 22 which would be housed within opening 34. As seen the neck portion 32 has a series of raised ridges 36 which would help one grasp the connector 30 at that point and move it along the cable as seen in FIG. 3 in the direction of arrows 40, as the assembly 30 is being placed onto the connection point 16. Turning back to FIG. 2A, there is seen an enlarged body portion 42 which of course, includes an enlarged opening 46 therein. There being an enlarged neck area 48 which is connecting the enlarged body portion 42 to the neck portion 32. Likewise, the body portion 42 has a series of raised ridges 44 which would be used again to grasp and pull the connector boot assembly into the position as seen in FIG. 3 with the two connectors 30 which are engaged around connection point 16. As further illustrated, there is a first end portion 50 of the connector body 30 at the smaller neck portion 32 which has no lip portion but really sealably engages along the entire interior surface 52 around cable 22. However, there is a second end 52 of the connector body which has an inward depending sealing lip 54 which would have a flexible shoulder portion 56 and a sealing ring 58 so that when the connector body is slid over the cable and the larger portion 42 is slid over the nut 18, the lip 54 flexes and allows the cable to slidably engage upon the nuts 18 as seen in FIG. 2 but once in place, the lip 58 would seal around the connection point 16 and would not allow moisture or the like to enter the connection. It is important that both ends 50 and 52 are sealed so that there is no water or the like which may enter the connection through those end portions.

In FIG. 2B there is illustrated the same connector as seen in FIG. 2A with the exception that FIG. 2B illustrates that the interior surface 52 of the connector body includes a thin layer of metallic substance 60 such as aluminum, metal or the like, which would be used not necessarily to seal moisture but to protect the connection point at 16 from UV rays or other harmful chemical contaminants. It should be made clear that this boot assembly 30 can be used in either embodiment and in the more simplified embodiment, i.e. without the metallic layer 60, can be slid on and off the connection quite easily and can be manufactured quite inexpensively. Again, it is foreseen that the assembly body as illustrated in the Figures would be a flexible EPDM rubber, would be custom molded and not extruded, and would have the various attributes and features as discussed in this application. Furthermore, it should be understood that the re-enterable assembly which is utilized in the present invention could be used on copper, aluminum, or twisted pair coaxial cable in addition to the fiber optics and triaxial interfaces as provided.

Figure 2C:
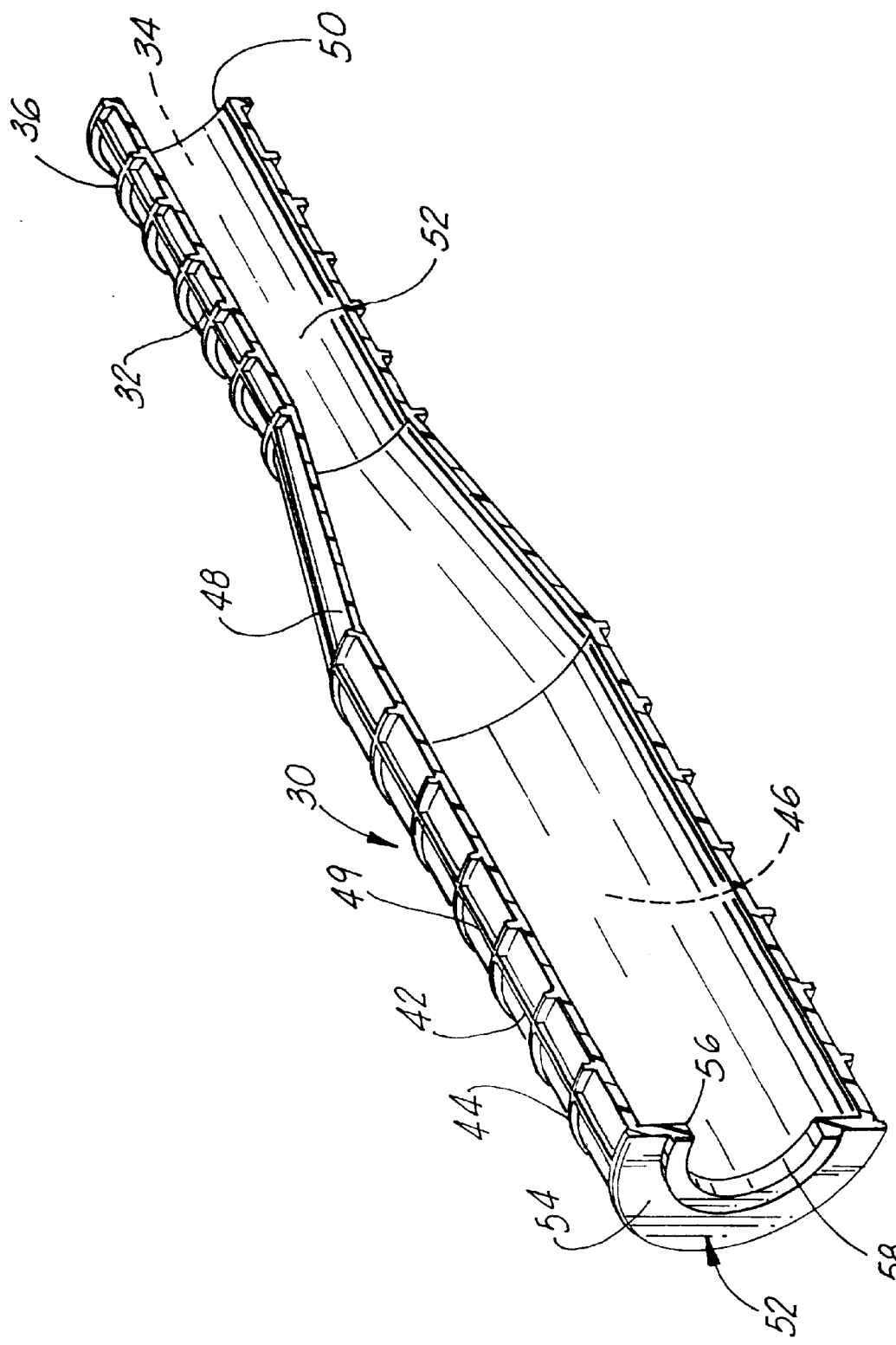
FIG. 2C illustrates a cross section of the preferred embodiment and apparatus of the present invention having a plurality of longitudinal and transverse raised ribs on the outside of the body.
Figure 3:
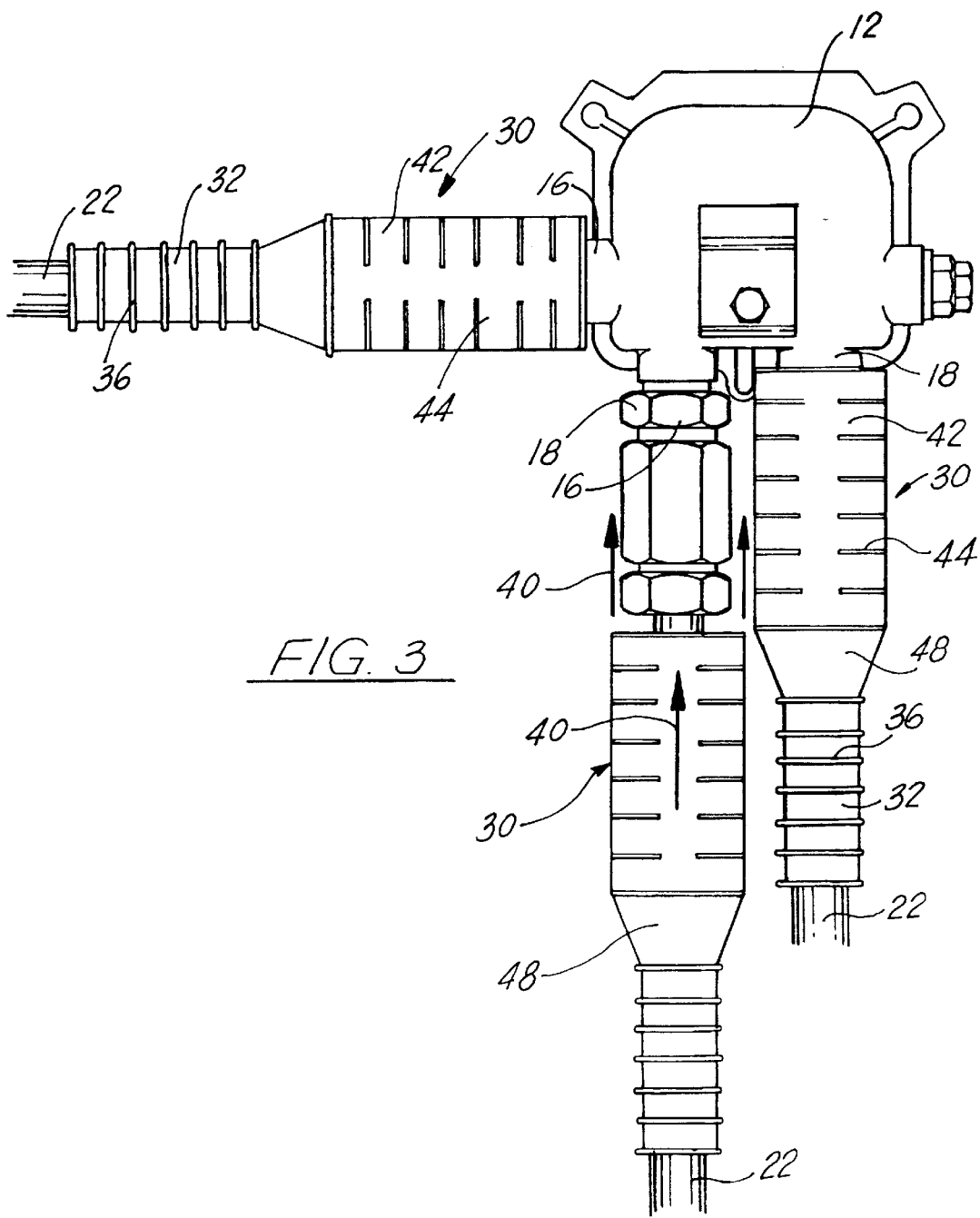
FIG. 3 illustrates an overall view of the present invention utilized in various connection points in a connection system.

In FIG. 2C there is further illustrated the same connector as seen in FIGS. 2A and 2B with the exception that the embodiment illustrated in FIG. 2C further comprises, in addition to the series of raised ridges 36 on the apparatus 30, a plurality of longitudinally disposed raised ribs 49 extending from a first end 50 to the second end 52 of the body for allowing for strain relief and gripping as the body is moved on and off of the connection point.

The foregoing embodiments are presented by way of example only; the scope of the present invention is to be limited only by the following claims.

What is claimed is:

1. A re-enterable assembly engageable upon a connector for coaxial cable, fiber optic, triaxial interfaces, the assembly comprising:
   a) a generally flexible one-piece assembly body having first and second end portions;
   b) the first end portion having an interior surface for sealing around an outer surface of a cable
   c) an enlarged body portion in communication with the first end portion for slidably engaging upon a connection point between a connector and the cable; and
   d) a lip member positioned on the second end portion of the one-piece assembly body which flexes against the body being slidably maneuvered onto and off of the connector, and provides for a sealing engagement around connector when the assembly is in place.

2. The apparatus of claim 1, further comprising a plurality of raised ribs on the outside of the body portion running traverse the body portion for defining means for gripping the assembly tightly as the assembly is twisted or pushed onto the connector between the assembly and a connection point.

3. The apparatus of claim 2, wherein the plurality of raised ribs further comprises a first plurality of ribs running traverse the exterior of the body portion, and the second plurality of raised ribs running longitudinally of the body portion.

4. The apparatus in claim 1 further comprising an internal metal based lining positioned along an interior surface wall of the assembly for preventing egress and ingress of radiation or other types of harmful contaminants from the connection point and the one-piece assembly body.

5. The apparatus of claim 1 wherein the assembly comprises a re-enterable assembly that does not require heat or chemicals to seal on the device or cable interface.

6. An assembly engageable upon a connector for copper, aluminum, and twisted pair coaxial cable, fiber optic, triaxial interfaces, the assembly comprising:
   a) a generally flexible one-piece assembly body having first and second end portions;
   b) a first end portion having an interior surface for sealing around an outer surface of a cable;
   c) an enlarged body portion in communication with the first end portion for slidably engaging upon a connection point between a connector and the cable;
   d) a lip member positioned on the second end portion of the one-piece assembly body which flexes against the body being maneuvered onto the connector, and provides for a sealing engagement around connector as the assembly is in place; and
   e) a plurality of raised ribs running traverse the body portion for defining a means for gripping the assembly tightly as the assembly is twisted or pushed onto the connector between the assembly and the connection point.

7. An re-enterable assembly engageable upon a connector for coaxial cable, fiber optic, triaxial interfaces, the assembly comprising:
   a) a generally flexible one-piece assembly body having first and second end portions;
   b) a first end portion having an interior surface for sealing around an outer surface of a coaxial cable;
   c) an enlarged body portion in communication with the first end portion for slidably engaging upon a connection point between a connector and the coaxial cable; and
   d) a flexible member slidably positioned on the second end portion of the one-piece assembly body which flexes against the body being maneuvered onto and off of the connector, and provides for a sealing engagement around connector when the assembly is slid in place.

* * * * *